US012194425B2

(12) United States Patent
Wang et al.

(10) Patent No.: US 12,194,425 B2
(45) Date of Patent: Jan. 14, 2025

(54) HOMOGENEOUS MIXING APPARATUS

(71) Applicant: Letsozone Enterprise Development Co., Ltd, Shanghai (CN)

(72) Inventors: Bill Wang, Shanghai (CN); Michael Zhang, Shanghai (CN)

(73) Assignee: Letsozone Enterprise Development Co., Ltd, Shanghai (CN)

( * ) Notice: Subject to any disclaimer, the term of this patent is extended or adjusted under 35 U.S.C. 154(b) by 498 days.

(21) Appl. No.: 17/623,973

(22) PCT Filed: Jun. 24, 2020

(86) PCT No.: PCT/CN2020/097907
§ 371 (c)(1),
(2) Date: Dec. 30, 2021

(87) PCT Pub. No.: WO2021/000766
PCT Pub. Date: Jan. 7, 2021

(65) Prior Publication Data
US 2022/0410097 A1 Dec. 29, 2022

(30) Foreign Application Priority Data
Jul. 1, 2019 (CN) ........................ 201910585003.9

(51) Int. Cl.
*B01F 33/82* (2022.01)
*B01F 23/20* (2022.01)
(Continued)

(52) U.S. Cl.
CPC ........... *B01F 33/821* (2022.01); *B01F 23/20* (2022.01); *B01F 25/53* (2022.01);
(Continued)

(58) Field of Classification Search
CPC ...... B01F 23/20; B01F 25/53; B01F 27/2731; B01F 33/811; B01F 33/821;
(Continued)

(56) References Cited

U.S. PATENT DOCUMENTS 7,344,126 B2 * 3/2008 Ji ............................ B01D 3/30 261/84
2007/0030322 A1 * 2/2007 Lee ...................... B41J 2/17593 347/88
(Continued)

FOREIGN PATENT DOCUMENTS

CA 3055016 A1 * 11/2018
CN 100563805 C 12/2009
(Continued)

OTHER PUBLICATIONS

Abstract of CA 3055016 A1 (Year: 2018).*
(Continued)

*Primary Examiner* — Charles S Bushey
(74) *Attorney, Agent, or Firm* — Fitch, Even, Tabin & Flannery LLP

(57) ABSTRACT

A homogenous mixing apparatus is provided that includes a circulation unit, a dynamic mixing unit, wherein a feeding port of the first-stage dynamic mixing device communicates with the discharging end of the circulation unit, a discharging port of the third-stage dynamic mixing device communicates with the feeding end of the circulation unit, and each of the dynamic mixing devices includes a dynamic mixer; and a control unit, configured to be capable of controlling the dynamic mixing unit, so that the dynamic mixers of the first-stage, second-stage, and third-stage dynamic mixing device are capable of being independently started and shut down and operated at independent rotating speeds, wherein the dynamic mixers each includes a stator and a rotor, rotating speed ranges of the dynamic mixers of the first-
(Continued)

stage, second-stage, and third-stage dynamic mixing device increase in sequence, and distances between the rotors and the stators decrease in sequence.

10 Claims, 2 Drawing Sheets

(51) Int. Cl.

| | |
|---|---|
| ***B01F 25/53*** | (2022.01) |
| ***B01F 27/272*** | (2022.01) |
| ***B01F 33/81*** | (2022.01) |
| ***B01F 35/21*** | (2022.01) |
| ***B01F 35/221*** | (2022.01) |
| ***B01F 35/222*** | (2022.01) |
| ***B01F 35/90*** | (2022.01) |

(52) U.S. Cl.
CPC ........ *B01F 27/2721* (2022.01); *B01F 33/811* (2022.01); *B01F 35/2113* (2022.01); *B01F 35/2115* (2022.01); *B01F 35/2213* (2022.01); *B01F 35/2215* (2022.01); *B01F 35/222* (2022.01); *B01F 35/90* (2022.01); *B01F 2035/99* (2022.01); *B01F 2215/0481* (2013.01)

(58) Field of Classification Search
CPC .............. B01F 35/2113; B01F 35/2115; B01F 35/2213; B01F 35/2215; B01F 35/222; B01F 35/90; B01F 2035/99; B01F 2215/0481
USPC ............................................................ 261/84
See application file for complete search history.

(56) References Cited

U.S. PATENT DOCUMENTS

| | | | |
|---|---|---|---|
| 2010/0090124 | A1 | 4/2010 | Kazem |
| 2013/0201785 | A1 | 8/2013 | Dahms et al. |

FOREIGN PATENT DOCUMENTS

| | | | |
|---|---|---|---|
| CN | 102451638 | A | 5/2012 |
| CN | 202860460 | U | 4/2013 |
| CN | 103349924 | A | 10/2013 |
| CN | 103349924 | B | 10/2013 |
| CN | 107207296 | A | 9/2017 |
| CN | 109821436 | A | 5/2019 |
| CN | 110180455 | A | 8/2019 |
| CN | 210544851 | U | 5/2020 |
| IN | 109200934 | A | 1/2019 |
| JP | H11209477 | A | 8/1999 |
| JP | 2007508133 | A | 4/2007 |
| JP | 2011036862 | A | 2/2011 |
| JP | 2018537959 | A | 12/2018 |
| JP | 2020517429 | A | 6/2020 |
| WO | 2011049215 | A1 | 4/2011 |
| WO | 2013066626 | A1 | 5/2013 |
| WO | 2016104780 | A1 | 6/2016 |

OTHER PUBLICATIONS

PCT International Search Report and Written Opinion of the International Search Authority issued in International Application No. PCT/CN2020/097907, Sep. 24, 2020, 7 pp.
PCT International Search Report and Written Opinion of the International Search Authority issued in International Application No. PCT/CN2020/097907, Sep. 24, 2020, 6 pp.

* cited by examiner

HOMOGENEOUS MIXING APPARATUS

TECHNICAL FIELD

The present invention relates to a homogeneous mixing apparatus.

BACKGROUND ART

The Chinese invention patent CN 103349924 B discloses a system for promoting dissolving of an ozone gas into a liquid, and relates to a dynamic mixer, which uses a rotor or a combination of a rotor and a stator to make the pressurized ozone gas fully transfer mass with the liquid with a certain pressure under a pressure condition, so as to increase a rate of dissolving the ozone gas into the liquid, improve the mixing efficiency, and finally output a fully dissolved ozone liquid. The dynamic mixer comprises a stator and a rotor. The stator forms a plurality of rows of stator teeth in an axial direction or a direction perpendicular to the axial direction. Each row of stator teeth comprises a plurality of teeth arranged in a circumferential direction. The rotor is located on an inner side of the stator, and is arranged to be rotatable relative to the stator by means of a rotating shaft. The rotor forms a plurality of rows of rotor teeth in an axial direction or a direction perpendicular to the axial direction. Each row of rotor teeth comprises a plurality of teeth arranged in a circumferential direction. Each row of stator teeth and rotor teeth are arranged in a staggered manner in the axial direction or the direction perpendicular to the axial direction. An axial gap and a radial gap are provided between each row of stator teeth and rotor teeth. The dynamic mixer further comprises a housing, one end of the housing is provided with an input end for introducing a material, the other end of the housing is provided with an output end for outputting a material, and the stator and the rotor are both arranged in the housing.

The inventor realized that the foregoing dynamic mixer not only can be used to promote mixing and dissolving of an ozone gas into a liquid, but also can be used for dissolution, dispersion or emulsification of other substances in two or more phases, such as gas-liquid mixing and liquid-liquid/liquid-solid dissolution, dispersion and emulsification. Mixing and dissolving is to mix two or more mutually soluble materials with each other by means of a mechanical or physical method, so that a concentration of each component can reach certain uniformity. Dispersion is to mix a gas or a solid having relatively poor miscibility with a liquid, and make solid particles or gas microbubbles uniformly distributed in the liquid to form a suspended state. Emulsification is an operation process in which two immiscible liquids are closely mixed, and one liquid is crushed into small droplets and then dispersed into the other liquid.

SUMMARY OF THE INVENTION

An object of the present invention is to provide a homogenous mixing apparatus, which can provide flexible operating modes to meet different mixing requirements.

The present invention provides a homogenous mixing apparatus with a material feeding direction, wherein a circulation unit comprises a storage space capable of storing materials, a feeding end capable of feeding materials, and a discharging end capable of outputting materials; a dynamic mixing unit sequentially comprises, in the feeding direction, a first-stage dynamic mixing device, a second-stage dynamic mixing device and a third-stage dynamic mixing device which are connected in series in a material circulating manner, and respectively correspond to mixing and dissolving, dispersion and emulsification of materials, wherein a feeding port of the first-stage dynamic mixing device communicates with the discharging end of the circulation unit, a discharging port of the third-stage dynamic mixing device communicates with the feeding end of the circulation unit, an upstream side of the first-stage dynamic mixing device is further provided with a first feeding device capable of feeding a material to the second-stage dynamic mixing device, an upstream side of the second-stage dynamic mixing device is further provided with a gas conveying device capable of conveying a gas to the first-stage dynamic mixing device, an upstream side of the third-stage dynamic mixing device is further provided with a second feeding device capable of feeding a material to the third-stage dynamic mixing device, and each of the dynamic mixing devices comprises a dynamic mixer; a control unit is configured to be capable of controlling the dynamic mixing unit, so that the dynamic mixers of the first-stage dynamic mixing device, the second-stage dynamic mixing device, and the third-stage dynamic mixing device are capable of being independently started and shut down and operated at independent rotating speeds; and the dynamic mixers each comprise a stator and a rotor, rotating speed ranges of the dynamic mixers of the first-stage dynamic mixing device, the second-stage dynamic mixing device, and the third-stage dynamic mixing device increase in sequence, and distances between the rotors and the stators decrease in sequence.

In an implementation, the dynamic mixer of the first-stage dynamic mixing device is configured such that the rotating speed is 0-500 r/min and the distance between the rotor and the stator is 10-20 mm; the dynamic mixer of the second-stage dynamic mixing device is configured such that the rotating speed is 500-1500 r/min and the distance between the rotor and the stator is 5-10 mm; and the dynamic mixer of the third-stage dynamic mixing device is configured such that the rotating speed is 1500-3000 r/min and the distance between the rotor and the stator is 0.1-5 mm.

In an implementation, the homogenous mixing apparatus further comprises a constant temperature device, wherein the constant temperature device controls temperature by exchanging heat with each of the dynamic mixing devices in the dynamic mixing unit via a heat exchange medium.

In an implementation, the constant temperature device comprises a thermostat for recovering the heat exchange medium and treating the heat exchange medium to a predetermined temperature for output, and a heat exchange pipeline for conveying the heat exchange medium; and the heat exchange pipeline passes through each of the dynamic mixing devices in the dynamic mixing unit from an outlet end of the thermostat to an inlet end of the thermostat in sequence.

In an implementation, each of the dynamic mixing devices in the dynamic mixing unit comprises a mixing cavity for mixing materials and a heat exchange medium channel surrounding the mixing cavity, and the heat exchange medium channel allows the heat exchange medium to flow from a peripheral side of the mixing cavity and exchange heat with the mixing cavity.

In an implementation, each of the dynamic mixing devices uses a double-layer structure comprising an inner layer and an outer layer, the inner layer surrounds the mixing cavity for mixing materials, and the annular heat exchange medium channel is arranged between the inner layer and the outer layer.

In an implementation, each of the dynamic mixing devices in the dynamic mixing unit comprises a mixing cavity for mixing materials, the heat exchange pipeline is designed as a metal coil in each of the dynamic mixing devices, and the metal coil is fixed to an inner wall or outer wall of the mixing cavity.

In an implementation, a downstream side of the dynamic mixing unit is further provided with a pressure regulating device, the pressure regulating device comprises a pressure gauge and a pressure valve, the pressure gauge feeds back a measured pressure to the control unit, and the control unit outputs a pressure control signal according to the measured pressure to control the pressure valve to implement pressure regulation.

In an implementation, a downstream side of the dynamic mixing unit is further provided with a temperature measuring device for measuring temperature, the temperature measuring device feeds back a measured temperature to the control unit, and the control unit outputs a temperature control signal according to the measured temperature to control the constant temperature device to implement temperature regulation.

In an implementation, the feeding end of the circulation unit is further provided with a tail gas treatment device, which discharges an escaping gas after the escaping gas is absorbed and decomposed.

The foregoing homogenous mixing apparatus can provide flexible operating modes through control of a controller to meet different mixing requirements. In addition, the foregoing homogenous mixing apparatus can further simplify operation difficulty for an operator, and the operator can implement different degrees of mixing of different materials only by adding different materials or additives under the control of the controller. In addition, the foregoing homogenous mixing apparatus can further greatly improve the mixing efficiency, shorten mixing time, have a high mixing efficiency, and also improve a mixing effect.

BRIEF DESCRIPTION OF THE DRAWINGS

The foregoing and other features, properties and advantages of the present invention will become more apparent from the following description with reference to the drawings and embodiments, in which.

DETAILED DESCRIPTION OF EMBODIMENTS

Figure 1:
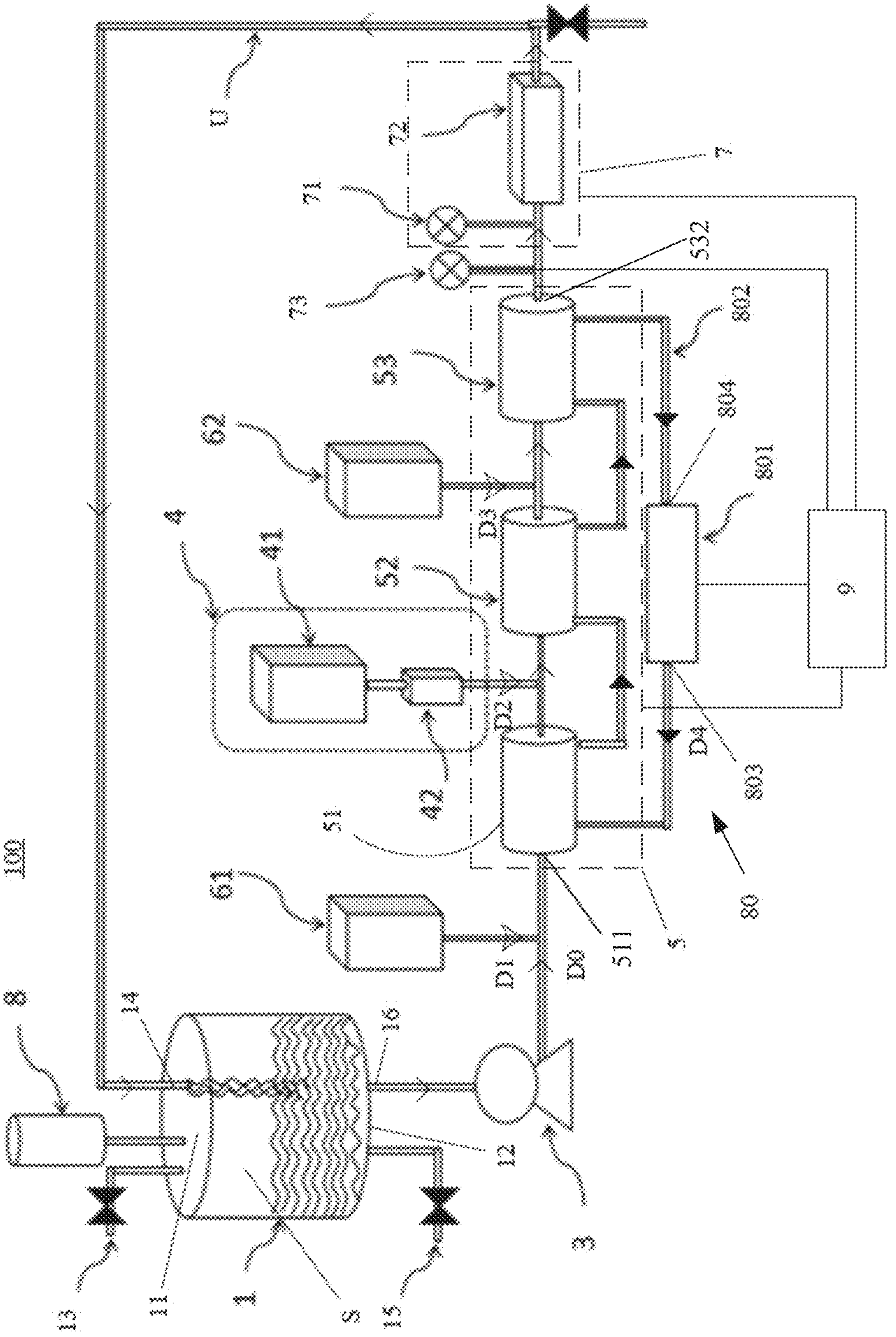
FIG. 1 is a schematic diagram of a homogenous mixing apparatus.

The present invention will be further described below in conjunction with specific implementations and the drawings, and more details are explained in the following description for the ease of fully understanding the present invention; however, the present invention can obviously be implemented in various different manners than that described herein, a person skilled in the art can make a similar extension and deduction without departing from the connotation of the present invention according to practical applications, and therefore the scope of protection of the present invention should not be limited to the content of the specific implementations herein.

For example, a first feature recorded later in the specification being formed above or over a second feature may include an implementation in which the first feature and the second feature are formed via a direct contact, or may include an implementation in which an additional feature is formed between the first feature and the second feature such that the first feature and the second feature may not be in direct contact. Additionally, reference numerals and/or letters may be repeated in different examples in these disclosures. This repetition is for the sake of brevity and clarity, and does not itself represent the relationship between the various implementations and/or structures to be discussed. Further, when a first element is described in connection with or in combination with a second element, the description includes an implementation in which the first element and the second element are directly connected or combined with each other, or includes use of one or more other intervening elements such that the first element and the second element are indirectly connected or combined with each other.

As shown in the present invention, unless the context clearly indicates an exception, the words “a”, “an” and/or “the” do not specifically refer to the singular, but may also include the plural. Generally speaking, the terms “including” and “comprising” only imply the inclusion of clearly identified steps and elements, these steps and elements do not constitute an exclusive list, and the method or apparatus may also include other steps or elements.

For ease of description, spatial relation words such as “under”, “below”, “lower than”, “beneath”, “above”, and “over” may be used herein to describe a relationship between an element or feature shown in the drawings and another element or feature. It shall be understood that these spatial relation words are intended to include other directions of the devices in use or operation besides the directions described in the drawings. For example, if the devices in the drawings are flipped, the direction of the element described as being “below” or “under” or “beneath” another element or feature will be changed to being “above” the another element or feature. Therefore, the example words “below” and “beneath” may include two directions: up and down. The device may also have other orientations (rotated by 90° or in another direction), and thereby spatial relationship descriptors used herein should be explained accordingly. In addition, it shall be further understood that when a layer is referred to as being “between” two layers, the layer may be the only layer between the two layers, or there may be one or more layers therebetween.

It should be noted that these and other subsequent drawings are merely used as examples, and are not necessarily drawn to scale, and should not be used as a limitation to the actually claimed scope of protection of the present invention. In addition, transformation modes under different implementations may be appropriately combined.

Referring to FIG. 1, FIG. 1 is a schematic diagram of a homogenous mixing apparatus 100. The homogenous mixing apparatus 100 has a material feeding direction D0. What is shown in the feeding direction DO may also be regarded as a material flow path or feeding path U, and the feeding path U may, for example, be composed of pipelines. In FIG. 1, the feeding direction DO is shown with a pointed arrow, and is roughly in a counterclockwise direction in the figure.

The homogenous mixing apparatus 100 comprises a circulation unit 1. The circulation unit 1 comprises a storage space S capable of storing materials. The circulation unit 1 further comprises a feeding end 11 capable of feeding materials and a discharging end 12 capable of outputting materials. For example, the circulation unit 1 may be a storage tank. In the illustrated implementation, the feeding end 11 comprises a feeding port 13 for feeding materials from the outside and a return port 14 for recovering materials, and the discharging end 12 comprises a discharging port 15 for discharging materials to the outside and a conveying port 16 for conveying materials to a dynamic mixing unit 5 to be described later for a mixing operation.

The homogenous mixing apparatus 100 comprises the dynamic mixing unit 5, which sequentially comprises a first-stage dynamic mixing device 51, a second-stage dynamic mixing device 52, and a third-stage dynamic mixing device 53 in the feeding direction DO. The first-stage dynamic mixing device 51, the second-stage dynamic mixing device 52, and the third-stage dynamic mixing device 53 are connected in series in a material circulating manner. That is, the first-stage dynamic mixing device 51 is located most upstream in the feeding direction D0, the third-stage dynamic mixing device 53 is located most downstream in the feeding direction D0, and the second-stage dynamic mixing device 52 is located between the first-stage dynamic mixing device 51 and the third-stage dynamic mixing device 53 in the feeding direction D0. In addition, materials can flow to the second-stage dynamic mixing device 52 via the first-stage dynamic mixing device 51, and then flow to the third-stage dynamic mixing device 53.

The first-stage dynamic mixing device 51, the second-stage dynamic mixing device 52, and the third-stage dynamic mixing device 53 respectively correspond to mixing and dissolving, dispersion and emulsification of materials. A feeding port 511 of the first-stage dynamic mixing device 51 communicates with the discharging end 12 of the circulation unit 1 (specifically, the conveying port 16 of the discharging end 12), and a discharging port 532 of the third-stage dynamic mixing device 53 communicates with the feeding end 11 of the circulation unit 1 (specifically, the return port 14 of the feeding end 11).

An upstream side of the first-stage dynamic mixing device 51 is further provided with a first feeding device 61, the first feeding device 61 can feed a material to the first-stage dynamic mixing device 51, such as an additive or material used as a mixed object, or another additive or material that needs to be added to facilitate mixing, or a dispersant corresponding to subsequent dispersion. In the illustrated implementation, the first feeding device 61 is arranged on the upstream side of the first-stage dynamic mixing device 51 and the second-stage dynamic mixing device 52 in the feeding direction DO.

Figure 2:
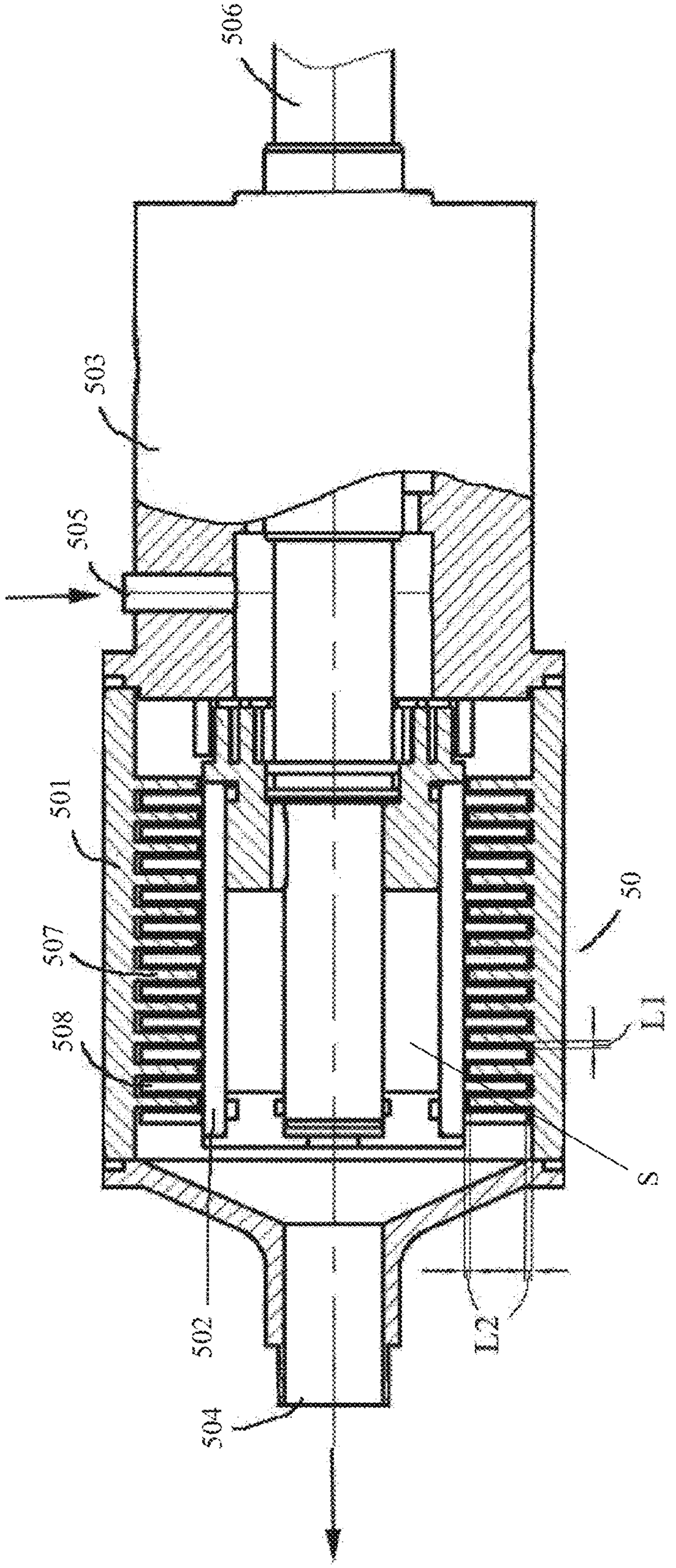
FIG. 2 is an example structure diagram of a dynamic mixer.

In the illustrated implementation, the homogenous mixing apparatus 100 further comprises a transfer pump 3, the transfer pump 3 is arranged between the circulation unit 1 and the dynamic mixing unit 5 or the first-stage dynamic mixing device 51 in the feeding direction D0, and the material is fed to the dynamic mixing unit 5 or the first-stage dynamic mixing device 51 from the circulation unit 1 via the transfer pump 3. In FIG. 2, the first feeding device 61 is arranged between the transfer pump 3 and the dynamic mixing unit 5 or the first-stage dynamic mixing device 51 in the feeding direction D0.

An upstream side of the second-stage dynamic mixing device 52 is further provided with a gas conveying device 4, and the gas conveying device 4 can convey a gas to the second-stage dynamic mixing device 52. In the illustrated implementation, the gas conveying device 4 is arranged between the first-stage dynamic mixing device 51 and the second-stage dynamic mixing device 52, so as to use the second-stage dynamic mixing device 52 to disperse the gas in a liquid.

The gas conveying device 4 may sequentially comprise a gas booster pump 41 and a gas flow control meter 42 in a gas conveying direction D2. The gas booster pump 41 may feed a gas and pressurize the fed gas. The gas flow control meter 42 can measure and/or control a flow of the gas, for example, the gas flow control meter 42 may be a gas flow meter and/or a flow control valve. For example, the gas conveying device 4 may add a gas such as oxygen, ozone, or carbon dioxide, and the gas flow control meter 42 controls a gas adding quantity to be adjusted to a proper gas-liquid ratio such that a concentration of the gas dissolved in the liquid is maximized without wasting excess gas. A gas conveying direction D2, the conveying direction D1 of a preceding first additive, and a conveying direction D3 of a subsequent second additive are indicated by hollow arrows; and after the gas or additive conveyed or fed from each of the conveying directions D1, D2, D3 is added to the feeding path U, the gas or additive becomes part of materials fed in the feeding direction DO, so that the flow path or feeding path indicated by each of the conveying directions D1, D2, D3 may also be considered as a branch of the feeding path U.

An upstream side of the third-stage dynamic mixing device 53 is further provided with a second feeding device 62, and the second feeding device 62 can feed a material to the third-stage dynamic mixing device 53, such as an emulsifier corresponding to emulsification or another additive or material that needs to be added to facilitate mixing or be used as a mixed object. In the illustrated implementation, the second feeding device 62 is arranged between the second-stage dynamic mixing device 52 and the third-stage dynamic mixing device 53 in the feeding direction D0. Each of the dynamic mixing devices, that is, the first-stage dynamic mixing device 51, the second-stage dynamic mixing device 52, and the third-stage dynamic mixing device 53, comprises a dynamic mixer.

The feeding devices 61, 62 may quantitatively add materials via, for example, a flow control valve, to implement fine control over a reaction, so as to obtain an optimal product of mixed reaction. Through the control over the speed of adding a dispersant, an emulsifier, or the like and an excellent dispersion and emulsification efficiency of the entire homogeneous mixing apparatus 100, adding a small amount of dispersant and emulsifier achieves a better dispersion and emulsification effect and reduces costs. A gas may also be added via the feeding devices 61, 62.

One example structure of the dynamic mixer 50 is shown in FIG. 2. Referring to FIG. 2, the dynamic mixer 50 comprises a stator 501 and a rotor 502. The dynamic mixer 50 further comprises a housing 503. One end of the housing 503 is provided with an input end 505 for introducing a material, and the other end of the housing 503 is provided with an output end 504 for outputting a material. It should be noted that the material before the mixing operation by the dynamic mixer 50 and the material after the mixing operation have different mixing states. For example, the material introduced via the input end 505 of the dynamic mixer 50 of the first-stage dynamic mixing device 51 may be a mixture of a gas and a liquid in two phases, while the material output from the output end 504 of the dynamic mixer 50 of the first-stage dynamic mixing device 51 after the mixing and dissolving action by the dynamic mixer 50 of the first-stage dynamic mixing device 51 may be a solution in which the gas has been dissolved in the liquid. In addition, as the first feeding device 61, the gas conveying device 4 or the second feeding device 62 add different gases or additives to the feeding path U, the composition of the material also varies in real time.

In the dynamic mixer 50, the stator 501 is arranged in the housing 503, and the stator 501 forms a plurality of rows of stator teeth 507 in an axial direction. Each row of stator teeth 507 may comprise a plurality of teeth arranged in a circumferential direction, and each of the stator teeth 507 extends in a direction perpendicular to the axial direction. The rotor 502 is arranged in the housing 503, and the rotor 502 is located on an inner side of the stator 501 and can rotate relative to the stator 501 by means of a rotating shaft 506. The rotor 502 forms a plurality of rows of rotor teeth 508 in an axial direction, and each row of rotor teeth 508 may comprise a plurality of teeth arranged in a circumferential direction. Each row of stator teeth 507 and rotor teeth 508 are arranged in a staggered manner in the axial direction. Each of the rotor teeth 508 extends in a direction perpendicular to the axial direction, and the stator teeth 507 and the rotor teeth 508 are arranged in a staggered manner in the axial direction. An axial gap L1 between each row of stator teeth 507 and rotor teeth 508 is preferably equal. A radial gap L2 between tooth tips of each row of stator teeth 507 and tooth roots of the rotor teeth 508 is preferably equal to a radial gap L2 between tooth tips of each row of rotor teeth 508 and tooth roots of the stator teeth 507. A distance between the rotor 502 and the stator 501 comprises an axial gap L1 and a radial gap L2.

A plurality of rows of rotors and stators are arranged in the dynamic mixer 50. The rotors and stators are staggered and fit each other. The rotors and the stators move relative to each other during rotation. Through the high-speed mixing by the rotors and the stators, different substances are fully mixed more efficiently in a shorter time, with no dead space for mixing, dispersion and emulsification.

The homogenous mixing apparatus 100 further comprises a control unit 9. The control unit 9 is configured to be capable of controlling the dynamic mixing unit 5, so that the dynamic mixers 50 of the first-stage dynamic mixing device 51, the second-stage dynamic mixing device 52, and the third-stage dynamic mixing device 53 are capable of being independently started and shut down and operated at independent rotating speeds. The control unit 9 may comprise one or more controllers, such as one or a combination of more of a microcontroller, a microprocessor, a reduced instruction set computer (RISC), an application-specific integrated circuit (ASIC), an application-specific instruction-set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), and any circuit or processor capable of performing one or more functions.

Rotating speed ranges of the dynamic mixers 50 of the first-stage dynamic mixing device 51, the second-stage dynamic mixing device 52, and the third-stage dynamic mixing device 53 increase in sequence, and distances between the rotors 502 and the stators 501 decrease in sequence, that is, both the axial gap L1 and the radial gap L2 decrease in sequence. For example, the dynamic mixer of the first-stage dynamic mixing device 51 is configured such that the rotating speed is 0-500 r/min and the distance between the rotor and the stator is 10-20 mm, which corresponds to mixing and dissolving; the dynamic mixer of the second-stage dynamic mixing device 52 is configured such that the rotating speed is 500-1500 r/min and the distance between the rotor and the stator is 5-10 mm, which corresponds to dispersion; and the dynamic mixer of the third-stage dynamic mixing device 53 is configured such that the rotating speed is 1500-3000 r/min and the distance between the rotor and the stator is 0.1-5 mm, which corresponds to emulsification. The higher the rotating speed, the smaller the distance, and the better the mixing effect. The distance between the rotor and the stator is different, and the distance is reduced from the first stage to the third stage, so that a shear effect of the rotor and the stator of the dynamic mixer is stronger, and mixtures will be mixed in a smaller and more dispersed form. The larger the contact area between mixtures in unit time, the higher the mixing efficiency. Through the arrangement of a plurality of stages of dynamic mixing devices, the mixture can be fully reacted in the dynamic mixing devices with different parameters to reach corresponding reaction stages.

In the illustrated implementation, the homogenous mixing apparatus 100 further comprises a constant temperature device 80. The constant temperature device 80 can control temperature by exchanging heat with each of the dynamic mixing devices 51, 52, 53 in the dynamic mixing unit 5 via a heat exchange medium such as liquid water, including cooling by using a cooling liquid, or raising temperature or keeping temperature according to process requirements.

The constant temperature device 80 comprises a thermostat 801 and a heat exchange pipeline 802. The thermostat 801 recovers the heat exchange medium and treats the heat exchange medium to a predetermined temperature for output, and the heat exchange pipeline 802 conveys the heat exchange medium. The heat exchange pipeline 802 passes through each of the dynamic mixing devices in the dynamic mixing unit in sequence from an outlet end 803 of the thermostat 801, that is, the heat exchange pipeline passes through the dynamic mixing devices 51, 52, 53 in sequence in a heat exchange direction D4 indicated by the solid arrow in FIG. 1, and finally returns to an inlet end 804 of the thermostat 801. That is, the thermostat 801 recovers the heat exchange medium through the inlet end 804 and then treats the heat exchange medium to a predetermined temperature, and the heat exchange medium is conveyed via the heat exchange pipeline 802 to exchange heat with the dynamic mixing devices 51, 52, 53 to implement a constant temperature effect. In the homogenous mixing apparatus 100, the heat exchange medium in the constant temperature device 80 can be recycled, which can save the heat exchange medium, thereby reducing costs, and the constant temperature effect on each of the dynamic mixing devices 51, 52, 53 is relatively consistent.

Each of the dynamic mixing devices 51, 52, 53 may comprise a mixing cavity for mixing materials and a heat exchange medium channel surrounding the mixing cavity, that is, the heat exchange medium channel is arranged around the mixing cavity. For example, each of the dynamic mixing devices 51, 52, 53 uses a double-layer structure comprising an inner layer and an outer layer or a sandwich structure, wherein the inner layer surrounds the mixing cavity for mixing materials, and the annular heat exchange medium channel is arranged between the inner layer and the outer layer. Therefore, the temperature in the mixing cavity can be regulated. The contact area between a cavity wall and the mixture of materials is large, a heat transfer speed is fast, and the reaction temperature of the mixture can be accurately controlled to implement an optimal reaction. For example, the dynamic mixer 50 of each of the dynamic mixing devices 51, 52, 53 may be regarded as a mixing cavity surrounded by an inner layer thereof. Further, an outer housing structure is additionally provided on the periphery of the dynamic mixer 50, and a heat exchange medium channel is formed between the outer housing structure and the dynamic mixer 50. Alternatively, the dynamic mixer 50 may be designed into a double-layer cylindrical structure comprising a cylindrical inner layer and a cylindrical outer layer, wherein the inner layer is enclosed into a cylindrical mixing cavity in which a stator and a rotor interact, and an annular heat exchange medium channel is formed between the cylindrical inner layer and the cylindrical outer layer. The heat exchange medium channel can allow the heat exchange medium to flow from a peripheral side of the mixing cavity and exchange heat with the mixing cavity.

In another implementation, each of the dynamic mixing devices 51, 52, 53 may comprise a mixing cavity for mixing materials, the heat exchange pipeline 802 may be designed as a metal coil in each of the dynamic mixing devices 51, 52, 53, and the metal coil is fixed to an inner wall or outer wall of the mixing cavity. For example, an inner space N of the dynamic mixer 50 constitutes a mixing cavity, and the heat exchange pipeline 802 may be designed in each of the dynamic mixing devices 51, 52, 53 as a metal coil fixed outside the housing 503 of the dynamic mixer 50 to exchange heat with the inner space N. The metal coil can increase a contact area and speed up heat conduction. The mixing cavity formed by the inner space N of the dynamic mixer 50 is designed in a sealed manner, so that the mixture can completely fill the mixing cavity or the inner space N, thereby removing air. Therefore, it is not easy to bring in external air to generate bubbles during emulsification, and the emulsification effect is better without a negative pressure operation.

In the implementation shown in FIG. 1, a downstream side of the dynamic mixing unit 5 is further provided with a pressure regulating device 7. The pressure regulating device 7 comprises a pressure meter 71 and a pressure valve 72. The pressure gauge 71 can measure a pressure and feed back the measured pressure to the control unit 9, and then the control unit 9 outputs a corresponding pressure control signal according to the pressure measured by the pressure gauge 71 to control the pressure valve 72 to implement pressure regulation. The pressure valve 72 can implement pressure control by, for example, adjusting an opening size of a path through which a material passes. The pressure regulating device 7 can regulate a pressure in the dynamic mixing unit 5 and a pressure in the feeding path U in real time to achieve an optimal pressure of the mixture reaction. For example, a required operating pressure can be set via the control unit 9, and then the pressure valve 72 is controlled to adjust the opening size, thereby causing a pressure change to be received by the pressure meter 71. The pressure meter 71 feeds back a received pressure signal to the control unit 9. When the pressure fed back is consistent with a set pressure, the regulation by the pressure valve 72 stops, thereby implementing the regulation of the required pressure.

In the implementation shown in FIG. 1, the downstream side of the dynamic mixing unit 5 is further provided with a temperature measuring device 73 for measuring temperature, such as a thermometer. The temperature measuring device 73 can feed back a measured temperature to the control unit 9, and the control unit 9 outputs a corresponding temperature control signal according to the temperature measured by the temperature measuring device 73, to control the constant temperature device 80 to implement temperature regulation.

Referring to FIG. 1, the feeding end 11 of the circulation unit 1 is further provided with a tail gas treatment device 8, and the tail gas treatment device 8 can discharge an escaping gas after the escaping gas is absorbed and decomposed. Harmful gases generated in the process of mixed reaction are accumulated in the circulation unit 1, and are absorbed and decomposed by the tail gas treatment device 8 at a top end of a storage space S and then discharged into the air without polluting the environment.

The following is an example of using different operating modes of the foregoing homogeneous mixing apparatus 100 to produce different products.

(1) Production of Oxygenating Chocolate

Quantitative cold-pressed vegetable oil is added to the circulation unit 1 via the feeding port 13, and the vegetable oil is conveyed to the first-stage dynamic mixing device 51, the second-stage dynamic mixing device 52, and the third-stage dynamic mixing device 53 via the transfer pump 3. Gas anion oxygen passes through the gas conveying device 4 and is introduced into the feeding path U, and the gas flow control meter 42 is adjusted to mix the gas anion oxygen with the vegetable oil in proportion. The second-stage dynamic mixing device 52 is set such that the rotating speed of the dynamic mixer thereof is 1000 r/min, and the first-stage dynamic mixing device 51 and the third-stage dynamic mixing device 53 do not operate. The pressure valve 73 is adjusted such that the pressure of the mixture is 2 bar. The circulation is performed, and the thermostat 801 is adjusted such that the temperature of the mixture is 18° C. until the reaction is completed. Liquid cocoa butter is added to the feeding path U via the first feeding device 61. The first-stage dynamic mixing device 51 is set such that the rotating speed of the dynamic mixer thereof is 500 r/min, and the second-stage dynamic mixing device 52 and the third-stage dynamic mixing device 53 do not operate. The thermostat 801 is adjusted such that the temperature of the mixture is 40° C. The circulation is performed, and a finished product is discharged from the discharging port 15 after the reaction is completed.

(2) Production of an Oxygenating Cream

Quantitative cold-pressed vegetable oil is added to the circulation unit 1 via the feeding port 13, and the vegetable oil is conveyed to the first-stage dynamic mixing device 51, the second-stage dynamic mixing device 52, and the third-stage dynamic mixing device 53 via the transfer pump 3. Gas anion oxygen passes through the gas conveying device 4 and is introduced into the feeding path U, and the gas flow control meter 42 is adjusted to mix the gas anion oxygen with the vegetable oil in proportion. The second-stage dynamic mixing device 52 is set such that the rotating speed of the dynamic mixer thereof is 1000 r/min, and the first-stage dynamic mixing device 51 and the third-stage dynamic mixing device 53 do not operate. The 73 is adjusted such that the pressure of the mixture is 2 bar. The circulation is performed, and the thermostat 801 is adjusted such that the temperature of the mixture is 18° C. The circulation is performed until the reaction is completed. Silicone oil and perfume are sequentially added to the pipeline in proportion via the first feeding device 61. The first-stage dynamic mixing device 51 is set such that the rotating speed of the dynamic mixer thereof is 700 r/min, and the second-stage dynamic mixing device 52 and the third-stage dynamic mixing device 53 do not operate. The thermostat 801 is adjusted such that the temperature of the mixture is 25° C. The circulation is performed until the reaction is completed. An emulsifier and deionized water are sequentially added to the feeding path U in proportion via the second feeding device 62. The third-stage dynamic mixing device 53 is set such that the rotating speed of the dynamic mixer thereof is 3000 r/min, and the first-stage dynamic mixing device 51 and the second-stage dynamic mixing device 52 do not operate. The thermostat 801 is adjusted such that the temperature of the mixture is 25° C. The circulation is performed, and a finished product is discharged from the discharging port 15 after the reaction is completed.

The following table shows the volume fraction of free oil in creams prepared by using different preparation methods.

| Method for preparation of creams | Preparation by a first-stage dynamic mixing device alone | Preparation by a second-stage dynamic mixing device alone | Preparation by a third-stage dynamic mixing device alone | Preparation by the first-stage dynamic mixing device, the second-stage dynamic mixing device, and the third-stage dynamic mixing device in cooperation |
|---|---|---|---|---|
| Volume fraction (%) of free oil after 24 h | 5 | 3 | 1 | 0 |
| Volume fraction (%) of free oil after 48 h | 10 | 5 | 2 | 1 |

In the foregoing table, 24 h and 48 h respectively refer to that the cream is placed in an oven at 40° C. and stays for 24 h and 48 h after the cream is prepared.

Different dynamic mixing devices can fully achieve different mixing effects due to their different distances between a rotor and a stator and different rotating speeds. The above shows that the cream prepared by the first-stage dynamic mixing device, the second-stage dynamic mixing device, and the third-stage dynamic mixing device in cooperation has better stability than the cream prepared by one stage of dynamic mixing device alone, and is not easy to demulsify.

(3) Production of Oxygenating Essential Oil

Quantitative cold-pressed camellia seed oil is added to the circulation unit 1 via the feeding port 13, and the camellia seed oil is conveyed to the first-stage dynamic mixing device 51, the second-stage dynamic mixing device 52, and the third-stage dynamic mixing device 53 via the transfer pump 3. Lavender essential oil is added into the feeding path U via the first feeding device 61. The first-stage dynamic mixing device 51 is set such that the rotating speed of the dynamic mixer thereof is 300 r/min. Gas anion oxygen passes through the gas conveying device 4 and is introduced into the feeding path U, and the gas flow control meter 42 is adjusted to mix the gas anion oxygen with the camellia seed oil in proportion. The second-stage dynamic mixing device 52 is set such that the rotating speed of the dynamic mixer thereof is 1200 r/min, and the third-stage dynamic mixing device 53 does not operate. The pressure valve 73 is adjusted such that the pressure of the mixture is 2 bar. The circulation is performed, and the thermostat 801 is adjusted such that the temperature of the mixture is 18° C. until the reaction is completed. A finished product is discharged from the discharging port 15 after the reaction is completed.

(4) Production of Vegetable Oil Emulsion

Quantitative cold-pressed vegetable oil is added to the circulation unit 1 via the feeding port 13, and the vegetable oil is conveyed to the first-stage dynamic mixing device 51, the second-stage dynamic mixing device 52, and the third-stage dynamic mixing device 53 via the transfer pump 3. Tea tree essential oil is added into the feeding path U via the first feeding device 61. The first-stage dynamic mixing device 51 is set such that the rotating speed of the dynamic mixer thereof is 200 r/min. An emulsifier and deionized water are sequentially added to the feeding path U in proportion via the second feeding device 62. The third-stage dynamic mixing device 53 is set such that the rotating speed of the dynamic mixer thereof is 2800 r/min, and the second-stage dynamic mixing device 52 does not operate. The thermostat 801 is adjusted such that the temperature of the mixture is 30° C. The circulation is performed, and a finished product is discharged from the discharging port 15 after the reaction is completed.

It can be seen from the foregoing production examples that the foregoing homogeneous mixing apparatus can be used for flexibly selecting operating modes according to actual requirements. The operation by an operator is very convenient, and the universality is very high. In addition, a plurality of devices do not need to be used in cooperation, so that an operation process is simplified, and a production cost is reduced. The foregoing homogeneous mixing apparatus can use the control unit to modify parameters such as reaction temperature and rotating speed according to different processes such as mixing, dispersion, and emulsification, and has a wide range of applications.

The foregoing homogeneous mixing apparatus can implement a cyclic mixed reaction. After returning to the circulation unit, the reaction mixture can enter the dynamic mixing unit again, for example, via the transfer pump, until the reaction is complete.

The foregoing homogeneous mixing apparatus can be rented for gas-liquid mixing and liquid-liquid/liquid-solid dissolution, dispersion, and emulsification.

The foregoing homogeneous mixing apparatus is particularly advantageous for the dispersion and emulsification of high-viscosity liquids, and the foregoing dynamic mixing device has a better effect on the shear mixing of high-viscosity fluids.

The present invention has been disclosed above in terms of the preferred embodiments which, however, are not intended to limit the present invention, and any person skilled in the art could make possible changes and modifications without departing from the spirit and scope of the present invention. Hence, any alterations, equivalent changes and modifications which are made to the above-mentioned embodiments in accordance with the technical substance of the present invention and without departing from the content of the technical solutions of the present invention, will fall within the scope of protection defined by the claims of the present invention.

The invention claimed is:

1. A homogenous mixing apparatus with a material feeding direction, comprising:

a circulation unit, comprising a storage space capable of storing materials, a feeding end capable of feeding materials, and a discharging end capable of outputting materials;

a dynamic mixing unit, sequentially comprising, in the feeding direction, a first-stage dynamic mixing device, a second-stage dynamic mixing device and a third-stage dynamic mixing device which are connected in series in a material circulating manner, and respectively correspond to mixing and dissolving, dispersion and emulsification of materials, wherein a feeding port of the first-stage dynamic mixing device communicates with the discharging end of the circulation unit, a discharging port of the third-stage dynamic mixing device communicates with the feeding end of the circulation unit, an upstream side of the first-stage dynamic mixing device is further provided with a first feeding device capable of feeding a material to the first-stage dynamic mixing device, an upstream side of the second-stage dynamic mixing device is further provided with a gas conveying device capable of conveying a gas to the second-stage dynamic mixing device, an upstream side of the third-stage dynamic mixing device is further provided with a second feeding device capable of feeding a material to the third-stage dynamic mixing device, and each of the dynamic mixing devices comprises a dynamic mixer; and a control unit, configured to be capable of controlling the dynamic mixing unit, so that the dynamic mixers of the first-stage dynamic mixing device, the second-stage dynamic mixing device, and the third-stage dynamic mixing device are capable of being independently started and shut down and operated at independent rotating speeds, wherein the dynamic mixers each comprise a stator and a rotor, rotating speed ranges of the dynamic mixers of the first-stage dynamic mixing device, the second-stage dynamic mixing device, and the third-stage dynamic mixing device increase in sequence, and distances between the rotors and the stators decrease in sequence.

2. The homogenous mixing apparatus according to claim 1, wherein the dynamic mixer of the first-stage dynamic mixing device is configured such that the rotating speed is 0-500 r/min and the distance between the rotor and the stator is 10-20 mm;

the dynamic mixer of the second-stage dynamic mixing device is configured such that the rotating speed is 500-1500 r/min and the distance between the rotor and the stator is 5-10 mm; and the dynamic mixer of the third-stage dynamic mixing device is configured such that the rotating speed is 1500-3000 r/min and the distance between the rotor and the stator is 0.1-5 mm.

3. The homogenous mixing apparatus according to claim 1, further comprising a constant temperature device, wherein the constant temperature device controls temperature by exchanging heat with each of the dynamic mixing devices in the dynamic mixing unit via a heat exchange medium.

4. The homogenous mixing apparatus according to claim 3, wherein the constant temperature device comprises a thermostat for recovering the heat exchange medium and treating the heat exchange medium to a predetermined temperature for output, and a heat exchange pipeline for conveying the heat exchange medium; and the heat exchange pipeline passes through each of the dynamic mixing devices in the dynamic mixing unit from an outlet end of the thermostat to an inlet end of the thermostat in sequence.

5. The homogenous mixing apparatus according to claim 3, wherein each of the dynamic mixing devices in the dynamic mixing unit comprises a mixing cavity for mixing materials and a heat exchange medium channel surrounding the mixing cavity, and the heat exchange medium channel allows the heat exchange medium to flow from a peripheral side of the mixing cavity and exchange heat with the mixing cavity.

6. The homogenous mixing apparatus according to claim 5, wherein each of the dynamic mixing devices uses a double-layer structure comprising an inner layer and an outer layer, the inner layer surrounds the mixing cavity for mixing materials, and the heat exchange medium channel is arranged between the inner layer and the outer layer.

7. The homogenous mixing apparatus according to claim 4, wherein each of the dynamic mixing devices in the dynamic mixing unit comprises a mixing cavity for mixing materials, the heat exchange pipeline is designed as a metal coil in each of the dynamic mixing devices, and the metal coil is fixed to an inner wall or outer wall of the mixing cavity.

8. The homogenous mixing apparatus according to claim 7, wherein a downstream side of the dynamic mixing unit is further provided with a pressure regulating device, the pressure regulating device comprises a pressure gauge and a pressure valve, the pressure gauge feeds back a measured pressure to the control unit, and the control unit outputs a pressure control signal according to the measured pressure to control the pressure valve to implement pressure regulation.

9. The homogenous mixing apparatus according to claim 3, wherein a downstream side of the dynamic mixing unit is further provided with a temperature measuring device for measuring temperature, the temperature measuring device feeds back a measured temperature to the control unit, and the control unit outputs a temperature control signal according to the measured temperature to control the constant temperature device to implement temperature regulation.

10. The homogenous mixing apparatus according to claim 1, wherein the feeding end of the circulation unit is further provided with a tail gas treatment device, which discharges an escaping gas after the escaping gas is absorbed and decomposed.

* * * * *